Figure 4:
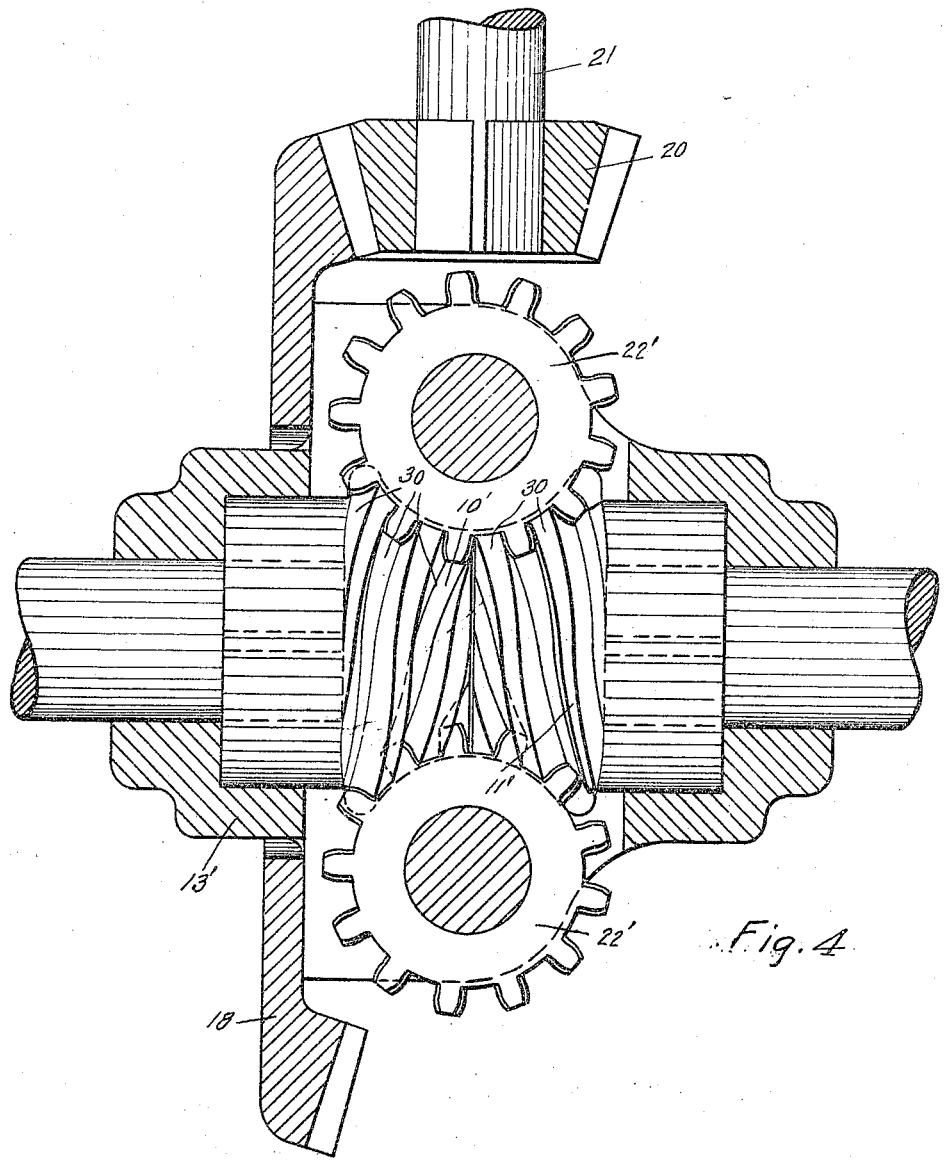

H. M. PATCH.
DIFFERENTIAL GEARING.
APPLICATION FILED DEC. 4, 1915.
1,259,279.
Patented Mar. 12, 1918.
2 SHEETS—SHEET 1.
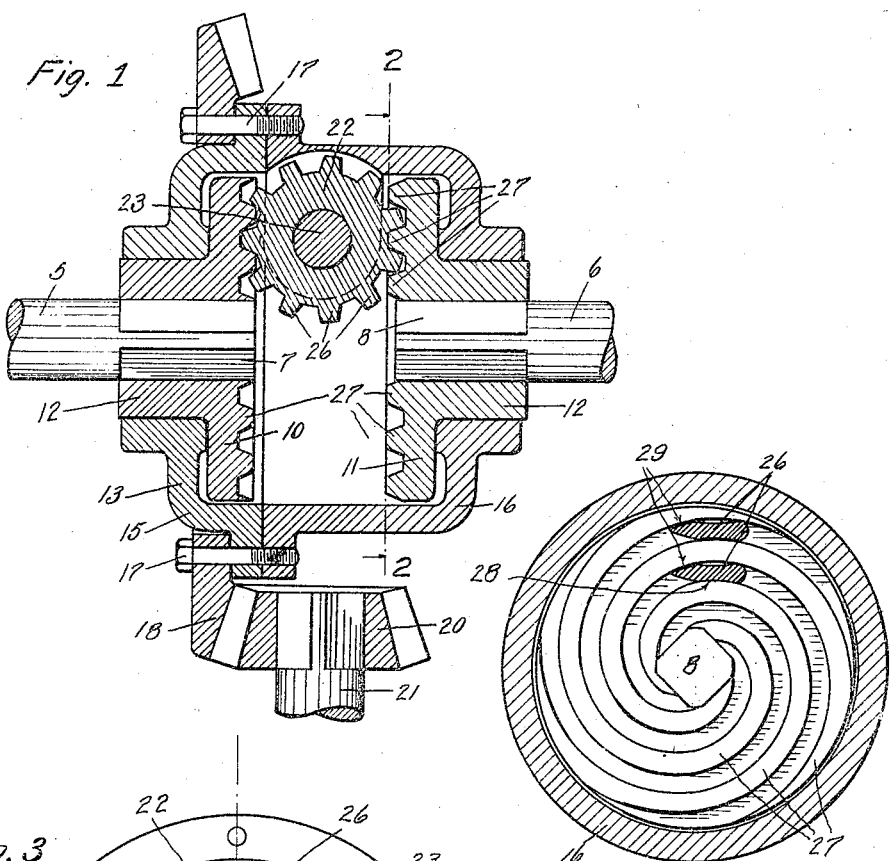
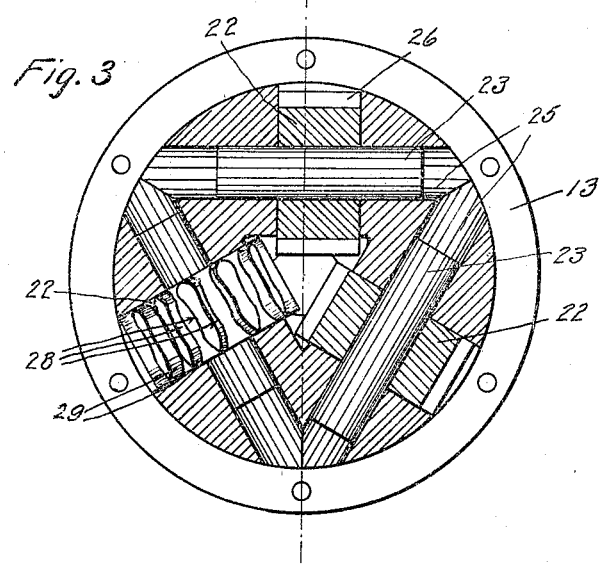
INVENTOR
H. M. PATCH
BY
Pierre Barnes
ATTORNEY

UNITED STATES PATENT OFFICE.

HARRY M. PATCH, OF SEATTLE, WASHINGTON.

DIFFERENTIAL GEARING.

1,259,279.

Specification of Letters Patent.   Patented Mar. 12, 1918.

Application filed December 4, 1915.   Serial No. 64,964.

*To all whom it may concern:*

Be it known that I, HARRY M. PATCH, a citizen of the United States, residing at Seattle, in the county of King and State of Washington, have invented certain new and useful Improvements in Differential Gearing, of which the following is a specification.

This invention relates to improvements in differential gearing for automobiles, and has for its object the provision of mechanism of simple construction for equalizing the rotative speed of the driving wheels and to prevent the motive power from being applied to rotate one wheel faster than the other.

The invention consists in the novel construction, and combination of parts of an automobile differential gearing, as will be fully described in the following specification, illustrated in the accompanying drawings and finally set forth in the appended claims.

In said drawings, Figure 1 is a view in horizontal section of apparatus embodying my invention. Fig. 2 is a vertical section on line 2—2 of Fig. 1. Fig. 3 is a vertical section through the center of the rotatable housing as illustrated in Fig. 1. Fig. 4 is a view in horizontal section of an embodiment of my invention in somewhat modified form.

Referring to Figs. 1, 2 and 3 of said views, the reference numerals 5 and 6 indicate the inner ends of a divided wheel-axle of an automobile which ends are squared, as at 7 and 8, upon which relatively oppositely faced gear-wheels 10 and 11, to be hereinafter more specifically described, are respectively mounted.

Said gear-wheels are each formed with outwardly disposed hubs 12 with which a divided housing 13 is rotatively associated, said housing comprising the two sections 15 and 16 which are connected by bolts 17 which also serve to connect therewith the master-gear 18 through which said housing may be driven by the motor (not shown) through the meshing pinion 20 and power-shaft 21.

A plurality of pinions, as 22, are mounted upon spindles 23 supported in bearings 25 and spaced symmetrically within the housing 13. Said pinions are provided with teeth 26 of special form in mesh upon opposite sides within the convolutions of the gear-wheels 10 and 11 and adapted to be driven by the latter when either of wheel-axles 5 or 6 are rotated at a greater speed than the housing 13.

Referring particularly to Fig. 2, the gear-wheels 10 and 11, as now considered, are provided with teeth 27 of convolute configuration, raised upon their relatively opposed faces, the outermost portions of said teeth with which the pinion-teeth 26 engage having a relatively slight angular pitch; that is to say, at approximately twelve degrees angular advance, whereby said pinions may be driven in either direction by the rotative movements of the gear-wheels but the latter may not be driven in their turn by the rotation of the pinions. In effect, said gear-wheels act upon the pinions in the manner of a worm whose pitch inclination prevents its being back-driven by its intermeshing worm-gear.

The gear-wheels 10 and 11 have the convolutions of their respective teeth 27 cut in opposite directions so that when arranged in operative opposed relation, the teeth of both gear-wheels extend in similar directions.

The teeth 26 of said pinions are shaped to conform to the curvature of the spaces between the teeth 27 of the gear-wheels and are of similar and symmetrical configuration in order that they may be similarly acted upon by the respective opposed teeth of both gear-wheels. That is to say, upon each side of a tooth an intermediate concave portion 28 is formed, adapted to be engaged by the outer convex side of a tooth 27 tending to drive the proximate side of the pinion in outward directions, and a convex portion 29 at that end of each said tooth extending in the direction toward the converging convolutions adapted to be engaged by the inner concave side of a tooth 27 and tending to drive the proximate side of the pinion in inward directions.

When the vehicle is driven upon the straight course, the gear wheels 10 and 11 are driven with the housing and the axles 5 and 6 at the same speed, and the pinions 22 are motionless upon their axes. When rounding a corner, one axle section runs ahead and the other axle section runs below the housing speed. By observing Fig. 1 it will be seen that if rounding a corner with the section 5 outside, such section is compelled to rotate more rapidly than the section 6, with the result that the gear member 10 causes the pinions 22 to rotate on their axes and the rotation of such pinions is in such a manner that the gear wheels are forced to rotate more slowly. The manner of operation is similar to that involved in the patent to Graham hereinafter referred to.

Owing to the angular pitch of the gear-wheel teeth, one gear-wheel cannot be driven by the other gear-wheel directly through the pinion, but only through the housing as described. When one vehicle-wheel loses traction, it cannot be driven by the motor faster than the other wheel or caused to spin, as no rotation can be imparted to the gear-wheels by the rotation of the pinions upon their own axes.

I am aware that other devices for equalizing the speed of the driving wheels of automobiles have been utilized, which embody right and left toothed gear-wheels intermeshing with double-threaded worms mounted in a rotatable housing, wherein the worms are actuated by one worm-gear to rotate the opposite worm-gear, as shown and described in patent to Graham, No. 1,112,422. In my invention, it is essential that the pinions 22 shall prevent the transmission of motion from one gear-wheel to the other, except through the housing, and by rotation of said pinions about the axes of the gear-wheels whereby one vehicle wheel cannot be driven faster than the other through loss of traction.

In Fig. 4 I illustrate a modified form of my invention, wherein the wheel axles $5^1$ and $6^1$ are provided with worms $10^1$ and $11^1$ having threads 30 of relatively opposite pitch.

Worm-pinions $22^1$ are operatively engaged with said worms and are rotatively mounted in the housing $13^1$ in a manner analogous to the previously described construction.

The angular pitch of the threads 30 are such that the worms $10^1$ and $11^1$ will readily rotate the worm-pinions $22^1$ upon their axes, but the worms may not be actuated by the rotation of the worm-pinions upon their axes but only through their rotation around the axes of the worms.

Having described my invention, what I claim, is—

1. In differential gearing, a rotatable housing, a pinion mounted for rotation in said housing, a pair of gear wheels in relatively opposite relation having teeth in mesh with said pinion, the teeth of the pinion being rounded at one end and pointed at the other, with the opposite faces thereof concaved, the teeth of said gear-wheels having a relatively opposite angular pitch of relatively slight angular advance whereby rotary motion from one said gear-wheel to the other by the rotation of said pinion about its axis, is prevented, the rotation being permitted by the rotation of said pinion about the axes of the gear-wheels.

2. In differential gearing, a driven housing, a pair of alined axles rotatably mounted axially of said housing, gear-wheels fixedly secured to the inner ends of said axles having teeth of relatively opposite angular pitch, a pinion rotatively mounted in said housing having teeth intermeshing with both said gear-wheels, the teeth of the pinion being rounded at one end and pointed at the other, with the opposite faces thereof concaved, the angular advance of said gear-wheel teeth being adapted to rotatably drive the pinion about its axis and to prevent the gear-wheels from being rotated by the pinion.

3. In differential gearing, a pinion, a pair of gear-wheels each fixedly connected to wheel-axles arranged in alinement, said pinion being in mesh with both said gear-wheels and adapted to be rotated about its axis by either gear-wheel, the teeth of the pinion being rounded at one end and pointed at the other, with the opposite faces thereof concaved, the teeth of said gear-wheels having angular relation to the teeth of said pinion whereby the pinion in its axial revolution is prevented from rotating the gear wheels, and a housing carrying said pinion through which rotary motion of the pinion imparted by one gear-wheel is transmitted to the other gear-wheel.

4. In differential gearing, a rotatable housing, means to rotate said housing, a pinion mounted for rotation in said housing, a pair of alined wheel-axles rotatively mounted axially of said housing, gear-wheels fixedly secured to the inner ends of said axles, said gear-wheels having relatively opposed faces provided with teeth of oppositely directed convolute configuration having angular pitch of relatively slight angular advance and intermeshing upon opposite sides with the teeth of said pinion, the teeth of the pinion being rounded at one end and pointed at the other, with the opposite faces thereof concaved, whereby the pinion may be rotated about its axis while the pinion is prevented from rotating the gear-wheels except through the rotation of the housing.

Signed at Seattle, Washington, this 19th day of November, 1915.

HARRY M. PATCH.

Witnesses:
HORACE BARNES,
E. PETERSON.